United States Patent [19]

Friedman

[11] 4,005,446
[45] Jan. 25, 1977

[54] PHOTOGRAPHIC FILM PROCESSING APPARATUS

[75] Inventor: Harvey S. Friedman, Natick, Mass.

[73] Assignee: Polaroid Corporation, Cambridge, Mass.

[22] Filed: Jan. 13, 1976

[21] Appl. No.: 648,638

[52] U.S. Cl. .............................. 354/86; 354/180; 354/304
[51] Int. Cl.² ........................................ G03B 17/50
[58] Field of Search ............. 354/85, 86, 180, 186, 354/304

[56] References Cited

UNITED STATES PATENTS

| 2,451,820 | 10/1948 | Garrett | 354/180 X |
| 2,873,658 | 2/1959 | Land | 354/86 |
| 3,541,937 | 11/1970 | Nerwin | 354/86 X |

Primary Examiner—R. L. Moses
Attorney, Agent, or Firm—Francis J. Caufield

[57] ABSTRACT

A photographic apparatus for transporting and processing in consecutive fashion a stacked array of self-processable film units. The apparatus includes an integrally molded plastic housing section having mounted thereon a pair of juxtaposed rotatable pressure applying rollers for receiving a film unit between them to distribute a processing fluid lengthwise of the film unit while they simultaneously advance it to the exterior of the apparatus, an elongated exit slot offset with respect to a gap formed between the rollers, a deflecting surface for bending the film unit toward the exit slot, a coiled light shade mounted adjacent the exit slot and extensible by an advancing film unit, a film retention arrangement, and a pair of spaced apart ramps protruding from the deflecting surface for aligning the trailing edge of a retained film unit with the leading edge of a next advancing film unit so that the next advancing film unit pushes the prior advanced one out of the apparatus to assure that the function of the coiled light shade is not circumvented.

11 Claims, 14 Drawing Figures

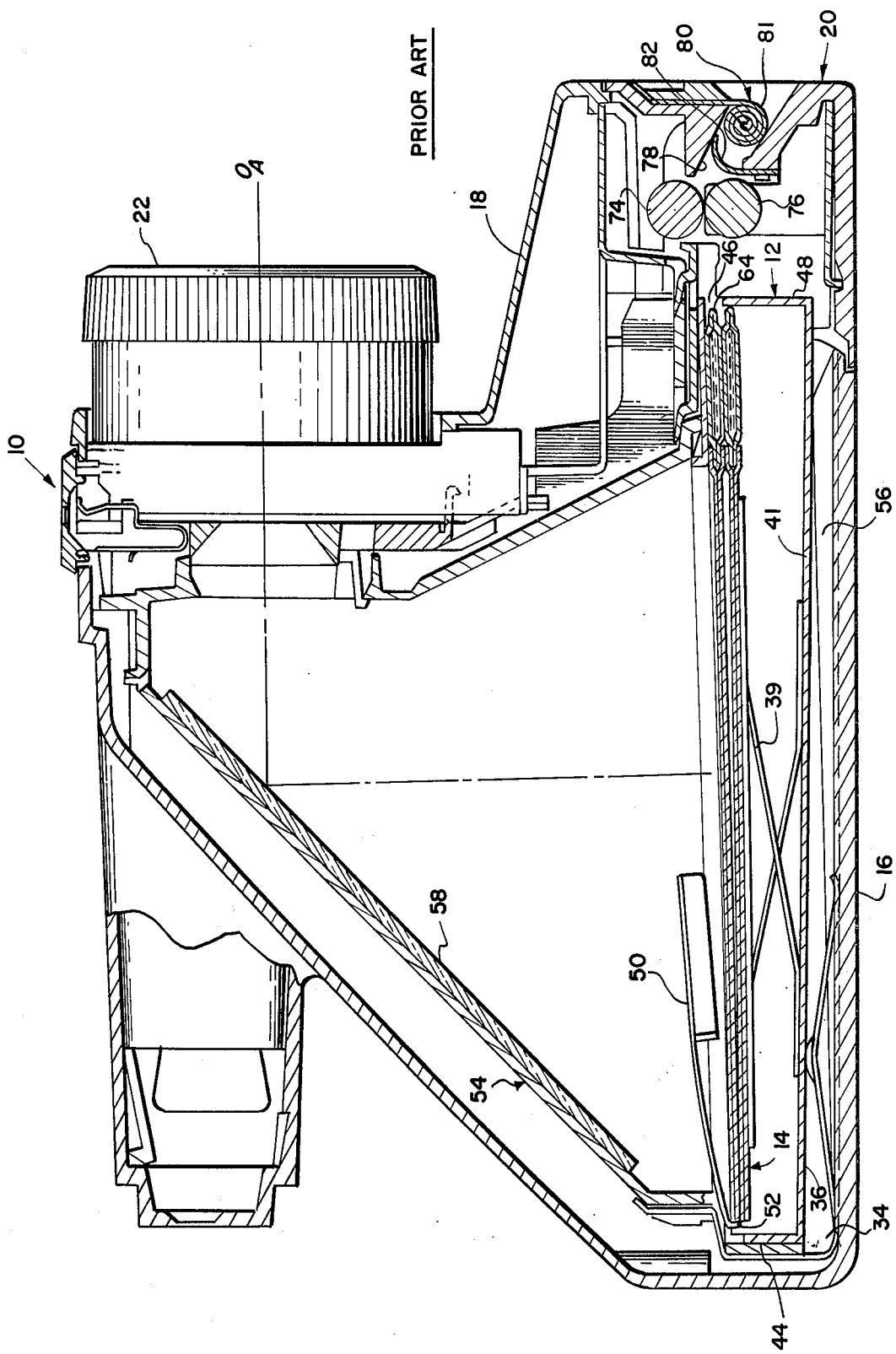

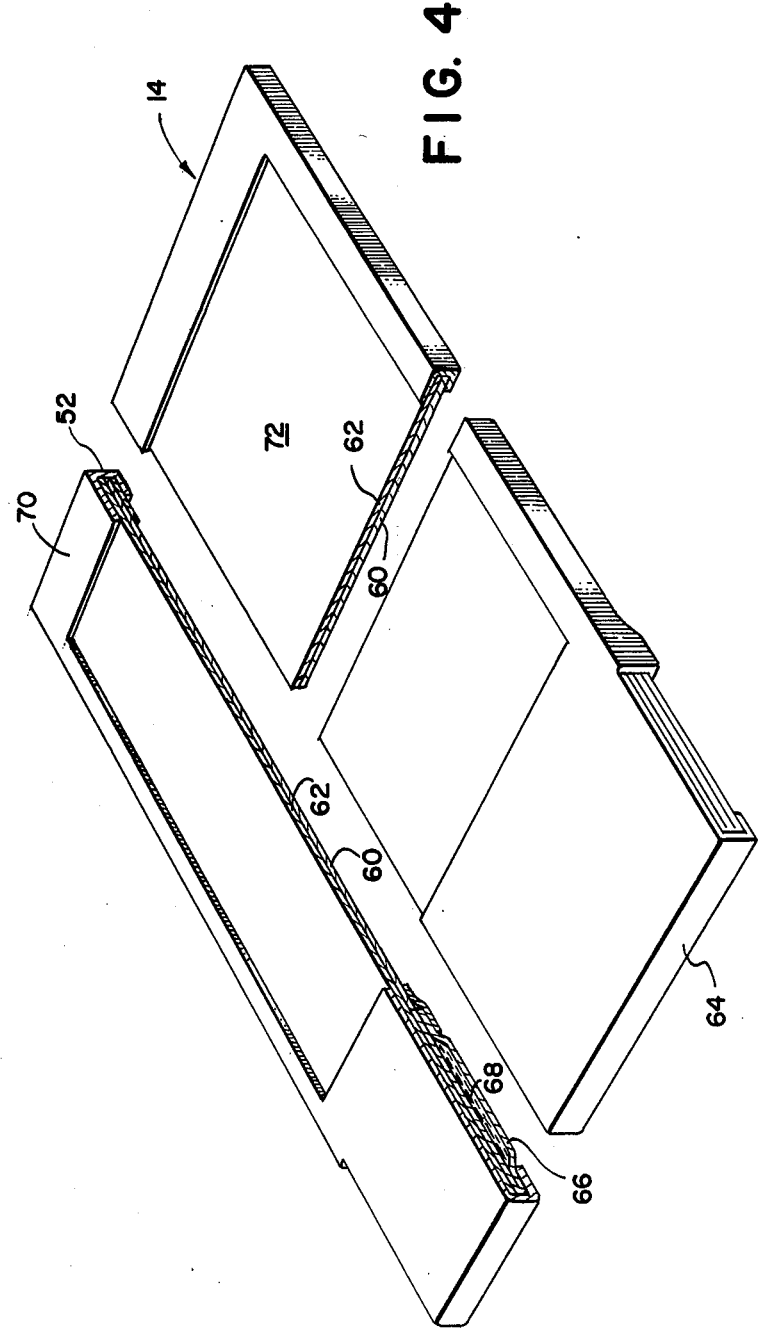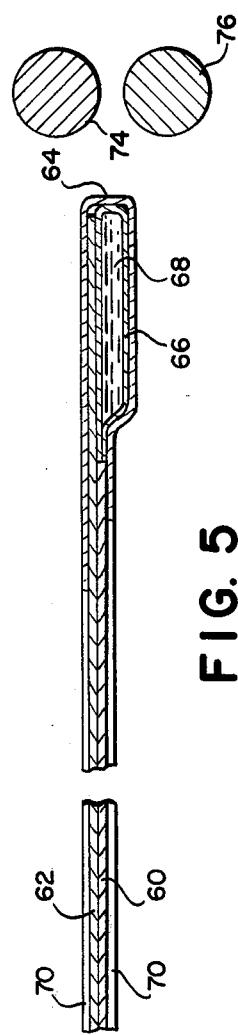

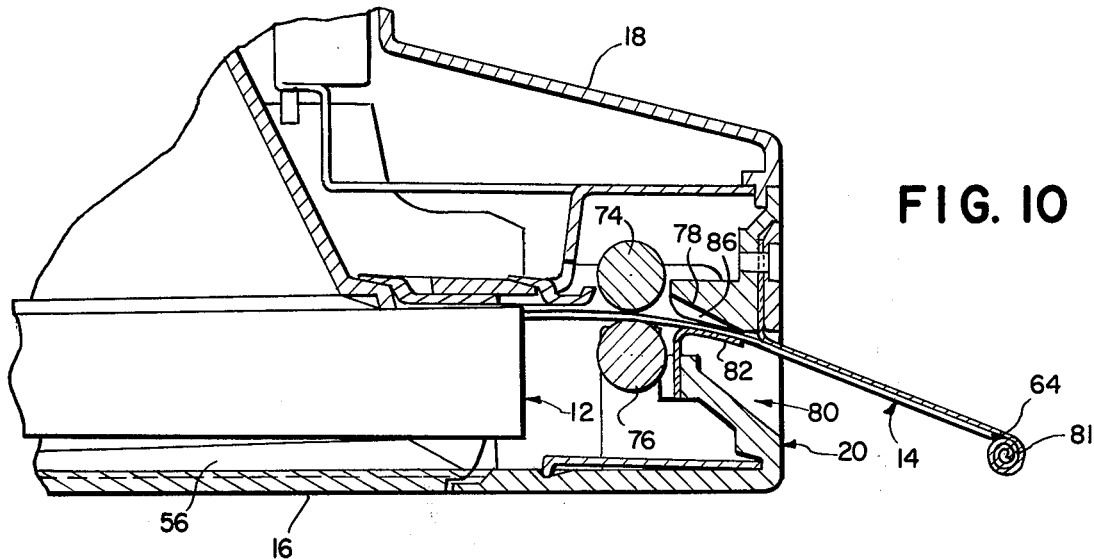
FIG. 10
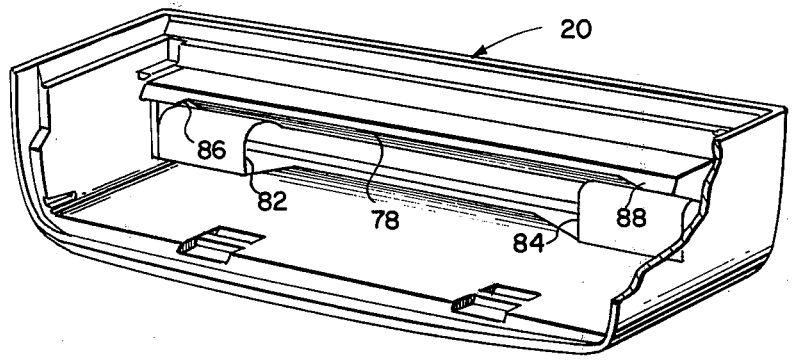
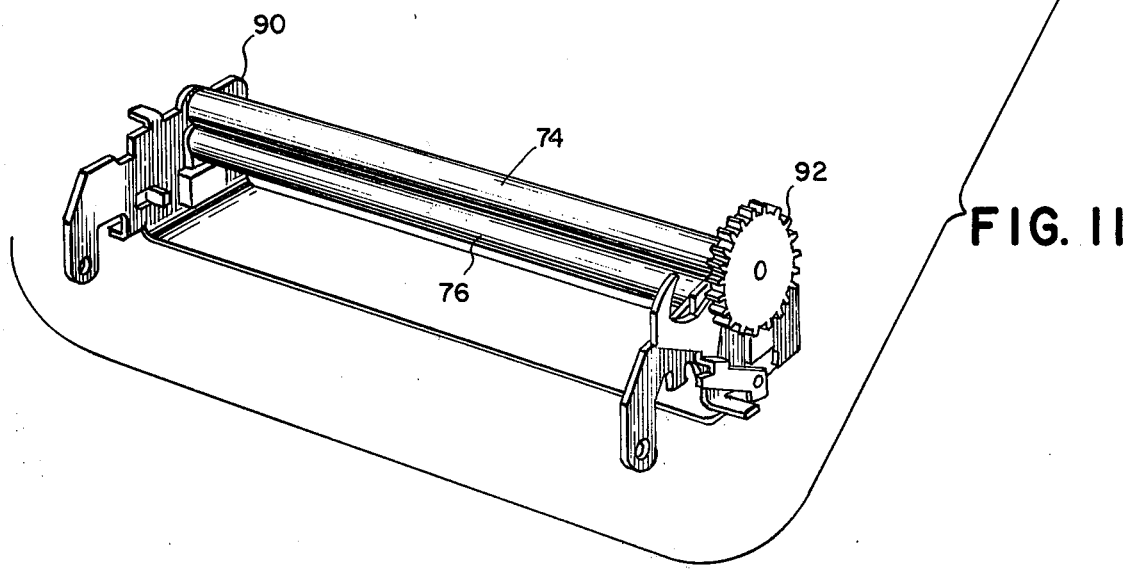
FIG. 11

PHOTOGRAPHIC FILM PROCESSING APPARATUS

BACKGROUND OF THE INVENTION

1. Field of the Invention

The present invention relates to the field of photography and, more specifically, to particular structural details that are incorporated into a virtually automatic photographic apparatus intended for use with self-processable type film units; the invention being directed to features of a housing that serves to support a film transport and processing system and retain a film unit after it has been processed.

2. Description of the Prior Art

Virtually automatic cameras that utilize so-called integral negative-positive diffusion transfer film products generally include film advancing and processing mechanisms that perform a series of operations during a picture taking cycle which transport an exposed film unit from an interior exposure station to exterior portions of the camera where it is then releasably retained by the camera so that a user may remove it. In this regard, refer to, for example, U.S. Pats. Nos. 3,709,122; 3,766,118 and 3,810,211 for a detailed description of mechanisms for performing the aforementioned operations of fim advancing, processing and port-processing retention, respectively. These patents collectively disclose a film advancing arrangement having a pick member that is adapted to enter a slot in the rear end of a cassette of film units, one stacked on the other, to engage the trailing edge of a foremost film unit, after its exposure, and advance it out of an elongated exit slot located in a forward wall of the cassette into a pressure generating gap formed between a pair of juxtaposed rotating fluid processing rollers. After the film unit is brought into engagement with the rollers, it is then further advanced by them while they simultaneously progressively spread a processing fluid across the film unit as it moves through them from its leading to its trailing edge. Once the leading edge of the film unit passes through the pressure gap, it is intercepted by a deflecting plate that bends it toward an exit slot that is spaced away from the gap and offset with respect to the path the film unit would naturally follow if the deflecting plate were not present. The deflecting plate influences fluid processing and also provides a light shading function and, as well, cooperates with portions of the exit slot to provide the film retention function previously mentioned.

Each time a user initiates a cycle, the sequence of events just described is repeated in consecutive fashion until, one after another, the supply of film is exhausted. It is therefore possible, if ech film unit in its turn is not removed, to accumulate a number of them in the film retention arrangement.

In presently available commercial cameras as, for example, Polaroid Corporation's SX-70 Land Camera which incorporates the features of the aforementioned patents, the accumulation of a number of film units in the film retention arrangement is not a problem for a variety of reasons.

First, the retention arrangement has the capability of holding a number of film units without affecting other camera functions such as processing or light shading. This is possible because the deflecting plate that provides the light shading function is nonmoving once the camera is placed in its picture taking mode. Also the bend induced in the film unit by the deflecting plate to influence the processing fluid distributing is relatively gentle so that small changes in the degree of film bending caused by the accumulated film units do not change processing conditions appreciably.

Secondly, after a certain number of film units have accumulated, subsequently advanced film units automatically begin to push those retained out of the camera so that jamming is precluded.

However, the present invention is concerned with a camera having a deflecting plate that induces a different bend in the film unit and further includes a light shade that is actuated by the advancing film unit itself, i.e., is moveable. These two features make it necessary to either manually remove each film unit after it is advanced to the exterior of the camera or provide some means within the camera that will automatically assure that all film units are subject to the same conditions during a picture taking cycle. These requirements become critical because the geometry producing the bend makes it inherently more sensitive to any dimensional changes in the path of travel that a film unit follows during processing. Any accumulation of film units in the film retention arrangement would produce significant dimensional changes which would have an undesirable influence on processing fluid distribution. Moreover, it is possible for subsequently advancing film units to bypass the moveable light shade and thereby circumvent its purpose.

For the above reasons there is a need to have a structural solution to the problem of being able to automatically eject a processed film unit from the film retention mechanism in order to clear the way for a subsequently processed film unit upon emerging from the processing apparatus. This may be accomplished by having the emerging film unit push the prior processed film unit out of the camera. In general terms, this solution has been disclosed in some prior art patents such as U.S. Pat. Nos. 3,541,937 and 3,541,938. However, in these disclosures the cameras have not been of the virtually automatic type and the film units do not have the same characteristics that are associated with the type of film that is being used in the present invention. In addition, the path of travel of the film unit in these patents is straight rather than bent. In short, the problems addressed are not the same as those encountered in the present invention.

SUMMARY OF THE INVENTION

The present is a photographic apparatus for use with a cassette having a stacked array off self-processable film units that are intended to be exposed and processed in consecutive fashion. The apparatus includes a structure for supporting the cassette in position for exposing the film units and a film advance mechanism for moving a film unit out of its exposure position and into engagement with a pair of juxtaposed rotatable pressure applying rollers mounted on a housing section in position to spread a processing fluid lengthwise of the film unit while simultaneously transporting it to the exterior of the apparatus. The housing section is an integrally molded plastic member having an elongated film exit slot offset with respect to the normal path of travel of the leading edge of a film unit as it emerges from between the rollers, a camming surface mounted intermediate the rollers and exit slot and positioned to intercept the leading edge of an advancing film and deflect it toward the exit slot, a coiled extensible light shade mounted adjacent the exit slot and positioned to be engaged by the leading edge of a film unit and extended thereby to progressively cover a portion of the film unit extending outside the apparatus until all of its photoexposed portions are entirely covered by the processing fluid, a film retention arrangement for releasably holding a film unit that has been processed with a major portion of it extending outside of the apparatus, and a pair of spaced apart ramps protruding from the camming surface for aligning the trailing edge of a retained film unit with the leading edge of a next advancing film unit so that the next advancing film unit pushes the prior advanced film unit out of the apparatus so that the next advancing film unit will not bypass the light shading coil.

An object of the invention is to provide an apparatus with structure for aligning the trailing and leading edges of consecutively processed film units so that a next advancing film unit will automatically push a prior advanced one out of the apparatus in order to assure that certain light shading features of the apparatus are not circumvented.

BRIEF DESCRIPTION OF THE DRAWINGS

The novel features that are considered characteristic of this invention are set forth with particularity in the appended claims. The invention itself, however, both as to its organization and its method of operation, together with other objects and advantages thereof, will best be understood from the following description of the illustrated embodiment when read in connection with the accompanying drawing wherein like numbers have been employed in the different figures to denote the same parts and wherein:

FIG. 3 is a diagrammatic cross-sectional side-elevational view of the camera in FIG. 1 showing the film cassette of FIG. 2 disposed within it without the invention;

FIG. 4 is a sectioned and exploded perspective view of one of the film units contained in the cassette of FIG. 2 to illustrate its various components;

FIG. 5 is a partial side-elevational sectional view of the film unit of FIG. 4 showing its relationship to a pair of processing rollers just prior to processing;

FIG. 6–9 are side-elevational sectional views broken away from the camera as illustrated in FIG. 3 and not containing the present invention. These views are included to illustrate the problems associated with apparatus not containing the present invention;

FIG. 10 is a view similar to view contained in FIGS. 6–9 but does include the present invention;

FIG. 11 is an exploded perspective view of a spread roller assembly and the housing member of the present invention for use with the camera of FIG. 1;

DESCRIPTION OF THE PREFERRED EMBODIMENT

In its preferred embodiment, the present invention is depicted as an integral part of a housing section that serves to support a fluid processing and film transport subsystem for a virtually automatic camera. The camera is the type that utilizes the so-called integral negative-positive type self-processable film unit.

The purpose of the invention is to provide a structural solution to a problem that arises because of the consecutive nature of the picture taking cycle of the camera, the physical characteristics of the film units, and the possibility of circumventing certain film light shading features incorporated into the housing section of the camera to provide additional protection against fogging of the film unit during its development outside the camera.

To fully understand the invention, the problem will be illustrated as it arises during the picture taking cycle of the camera without the invention incorporated in it followed by a description of how the problem is solved with the invention incorporated into the camera.

Figure 1:
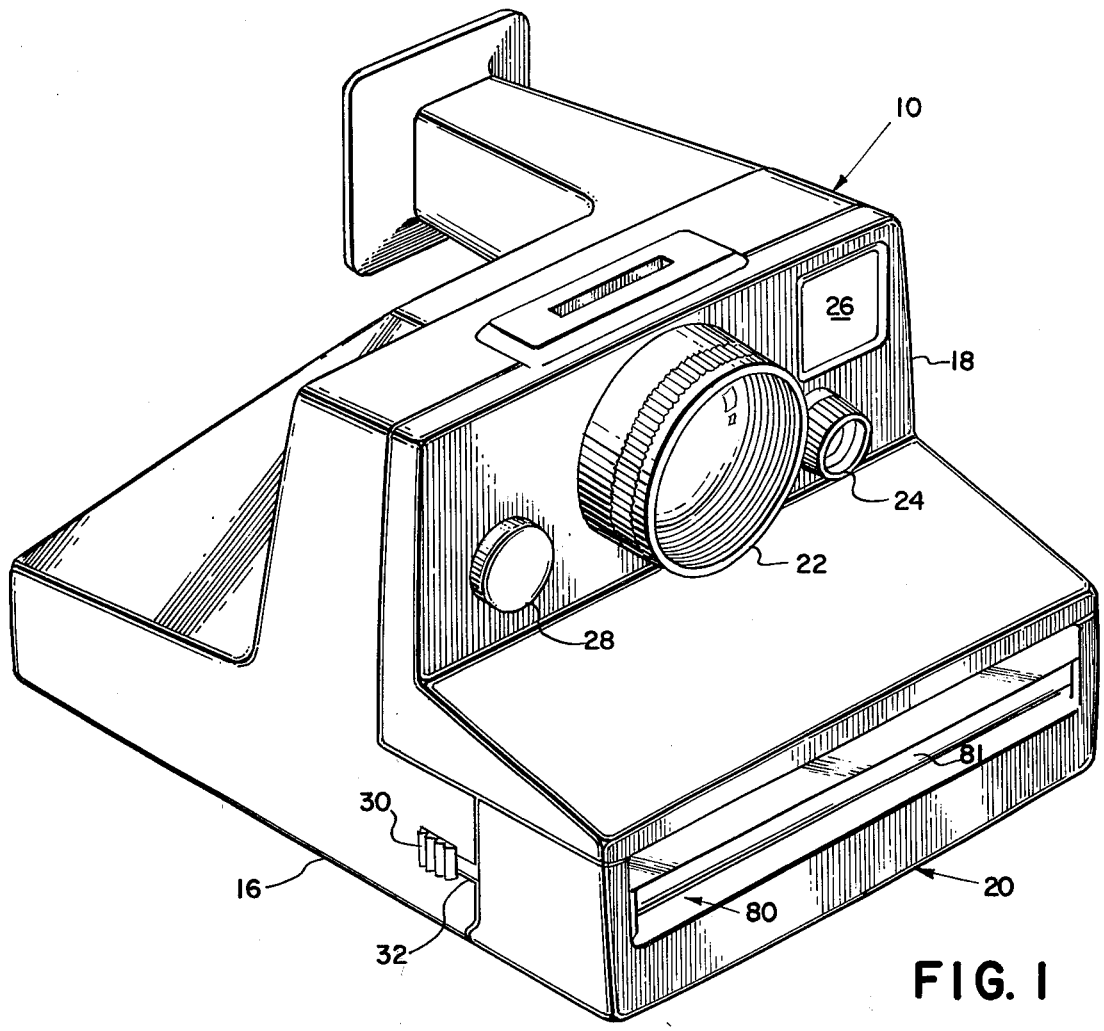
FIG. 1 is a perspective view of a compact, non-folding camera in which the present invention may be incorporated.

Accordingly, reference is now made to FIG. 1 which illustrates a virtually automatic rigid body camera 10. The camera 10 is adapted to use with a cassette of self-processable film units such as the one designated as 12 in FIG. 2. Each film unit contained in the cassette 12 in similar to the one illustrated as 14 in FIG. 4 and also indicated in FIG. 2.

The exterior of the camera 10 is formed by the interconnection of a body 16, an apron 18, and a housing section 20. Extending through the apron 18 is an objective lens 22 for forming an image of the scene, a photometer lens assembly 24 for collecting information about scene characteristics in order to assure that pictures will be properly exposed by a shutter located inside the camera 10 but not shown, a viewfinder window 26 through which the scene is viewed, and a camera start button 28 which is depressed to initiate a picture taking cycle.

The cassette 12 is loaded into the camera 10 by first actuating a latch release button 30 located on one side of the body 16. The button 30 slides in an elongated slot 32 permitting it to be pushed from its position shown in FIG. 1 in a forward manner until it actuates an internal latch arrangement which permits the housing section 20 to be rotated in a clockwise sense in FIG. 1. After the housing section 20 is rotated out of the way, the cassette 12 can then be inserted into a cassette receiving chamber 34 located inside the camera 10 (see FIG. 3). Once the cassette 12 has been placed inside the chamber 34, the housing section 20 is then swung back into its latched position to retain the cassette 12 inside the camera 10. FIG. 3 is a cross-sectional elevation view illustrating the camera 10 after it has been loaded with the cassette 12 in this manner.

Figure 2:
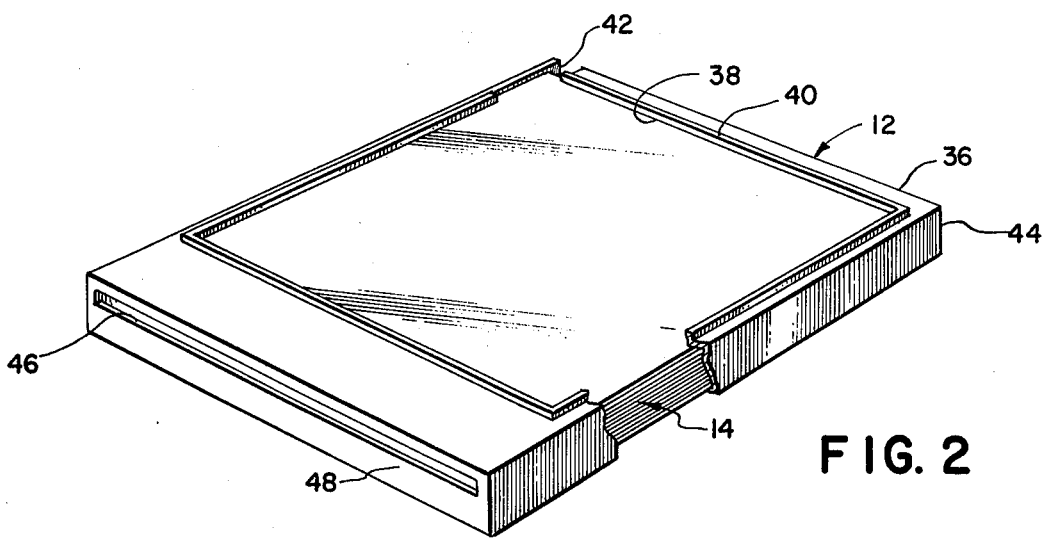
FIG. 2 is a perspective view with parts broken away of a cassette of film units for use with the camera of FIG. 1.

Referring now to FIGS. 2 and 3, the cassette 12 can be seen to include a box-like injection molded opaque plastic housing 36 that serves to contain a stacked array of the film units 14, one on top of the other. In order to facilitate the exposure of the film units 14, the housing 12 is provided with an exposure aperture 38 through which a foremost one of the film units 14 may be subjected to actinic radiation after a cassette dark slide is removed uncovering the aperture 38. The stacked array of the film units 14 are urged toward the exposure aperture 38 by a spring platen 39 that rests against a bottom wall 41. Surrounding the aperture 38 is an upwardly extending ridge 40 that aids in locating the cassette 12 in the chamber 34. The housing 36 also has two slots in it which provide a means for removing the film unit 14; the first, 42, provides access to the film units 14 through a rear wall 44 so that a film advance mechanism may be brought into engagement with a film unit after its exposure, and the second, 46, provides an exit in a forward wall 48 through which a film unit may be advanced by such a mechanism. In this connection reference is made, in particular, to FIG. 3 which shows a pick member 50 that is adapted to enter the slot 42 and engage a trailing edge 52 of a foremost film unit 14 to advance it through the exit slot 46 of the housing 36 after it has been exposed. The pick member 50 may be actuated by a mechanism similar to that shown and described in detail in U.S. Pat. No. 3,709,122.

When the cassette 12 is loaded in the chamber 34 the ridge 40 telescopes into a complimentary configured opening formed by the bottom edges of an inner cone member 54 which defines the exposure chamber of the camera 10. The telescoping results because of a slight interference created between the plastic housing 36 and a ramp 56 located inside the body 16. The interference in combination with the resilient properties of the plastic housing 36 causes an upward force which urges the cassette 12 into the opening of the cone to locate the cassette in position for exposure of a foremost one of the film units 14.

Proper exposure of the film units 14 may be effected by any conventional photoelectrically controlled shutter mechanism which could be used with the photometer lens assembly 24 as a scene evaluater to convert scene information to an electrical signal to regulate the exposure time. As can be seen in FIG. 3, actinic radiation from a scene would enter the exposing chamber formed by the cone 54 when the shutter was opened and pass through the objective lens 22 which would image the scene onto a foremost one of the film units 14. The path of the actinic radiation would be along the optical axis, OA, indicated in FIG. 3.

It is obvious from FIG. 3 that the camera 10 has a folded optical path; the radiation passing through the objective lens 22 being reflected off of a mirror 58 from which it is imaged onto the film unit 14.

As previously indicated the nature of the film unit and its physical characteristics play a role in the problem to be solved by the present invention. Consequently a description of the film unit and those characteristics relevant to the problem will now be taken up. Following that a description of the operations the film unit undergoes during a photographic cycle will be discussed pointing out the exact problem.

The film unit 14 is of the so-called integral negative-positive type which employs a diffusion transfer process to form the final image after exposure. Basically, it is a multilayer structure or laminate which is diagrammatically illustrated in FIGS. 4 and 5. It includes a bottom sheet like element 60 and a superposed top sheet-like element 62. Mounted adjacent a leading edge 64 is a rupturable container 66 which holds a supply of processing fluid 68. More specifically the multilayer structure includes an opaque bottom support sheet, a top transparent support sheet, and a plurality of layers sandwiched therebetween which include one or more photosensitive layers and one or more image-receiving layers. The laminate is bound along its lateral edges by a binding element 70 which also defines the limits of a generally square or rectangular image-forming area 72 on the top transparent support sheet through which actinic radiation is transmitted to expose the photosensitive system. Subsequent to exposure, the film unit is adapted to be progressively advanced between a pair of pressure applying members which discharge the fluid 68 between a pair of predetermined pairs of adjacent layers. For a more detailed description of the film unit 14 reference may be had to U.S. Pat. No. 3,415,644 issued to E. H. Land on Dec. 10, 1968.

One important physical characteristic of the film unit 14 may be attributed to the sheet-like members and the laminate structure. Because of these, the film unit is inherently flexible, making it easy to bend but also rendering it incapable of tolerating buckling loads, i.e., compressive loads applied along a line connecting its leading and trailing edges, 64 and 52 respectively. It has a tendency to remain flat or return to a flat format after being bent or after a buckling load has been removed. What role the flexibility plays will be seen later on.

Another distinctive feature of the film unit 14, the importance of which will subsequently also become apparent, is the fact that it is adapted for use under circumstances where at least a portion of the processing of the photoexposed photosensitive system or layers is conducted under conditions which would ordinarily result in its further exposure or fogging, i.e., it can be developed outside of the camera 10 in ambient light which can subject it to incident radiation many times higher than it received during its initial photoexposure inside of the camera 10. This is possible because the processing fluid 68 contains an opacifying agent, which when spread between the predetermined layers of the film unit 14, protects it against activating radiation after initial photoexposure. This protection is provided from a time immediately after processing is begun until at least a time when development of the photoexposure is complete and/or until a time when any subsequently exposed portions of the photosensitive system cannot undergo further development by the processing fluid 68 involved in development of the photoexposed image pattern. However, even though this unique opacifying agent is particularly effective in protecting the film units, 14, when subject to high ambient light conditions outside of the camera 10 while development takes place, not all of the initially photoexposed portions of the film unit 14 are protected at the same time. This comes about because the processing fluid 68 is spread across the film unit 14 in a progressive manner covering those portions emerging from the camera 10 first while leaving those portions remaining in the camera 10 uncovered until they, too, pass through the processing apparatus. We can see how this happens by referring back to FIG. 3. The housing section 20 is seen to include a pair of juxtaposed fluid spreading rollers, 74 and 76, that define an elongated pressure generating gap between them that is positioned to receive the leading edge 52 of the film unit 14 when it is advanced between the rollers by the pick member 50. Once the leading edge 52 is brought into engagement between the rollers, 74 and 76, the rollers, if they are made to rotate, then progressively further advance the film unit 14 while simultaneously spreading the processing fluid 68. After the leading edge 52 emerges from the gap between the rollers, 74 and 76, it tends to follow a normal path of travel determined by its resiliently flexible characteristic. However, a camming surface 78 or deflecting surface is provided to intercept the film unit 14 and deflect it toward an elongated offset exit slot 80 in the camera 10. The purpose of the surface 78 is to provide a means for controlling the thickness distribution of the fluid 68 throughout the film unit 14. This demonstrates that the processing fluid 68 is spread progressively across the length of the film unit 14 as it is advanced through and by the rollers, 74 and 76. From the geometry involved it is obvious that part of the film unit 14 extends outside of the camera 10 while some of it will be inside without any processing fluid covering it. In this connection, the rollers, 78 and 80, may be rotated using a mechanism similar to that disclosed for, example, in U.S. Pats. Nos. 3,709,122 and 3,776,118.

Although the opacifying agent in the processing fluid 68 is quite effective, it is possible under extreme circumstances to have ambient light, incident on the portions of the transparent sheet element 62 of the film unit 14, extending outside of the camera 10, piped back to portions of the film unit 14 inside the camera that are as yet unprotected by the processing fluid 68.

Figures 6, 7, 8, 9:
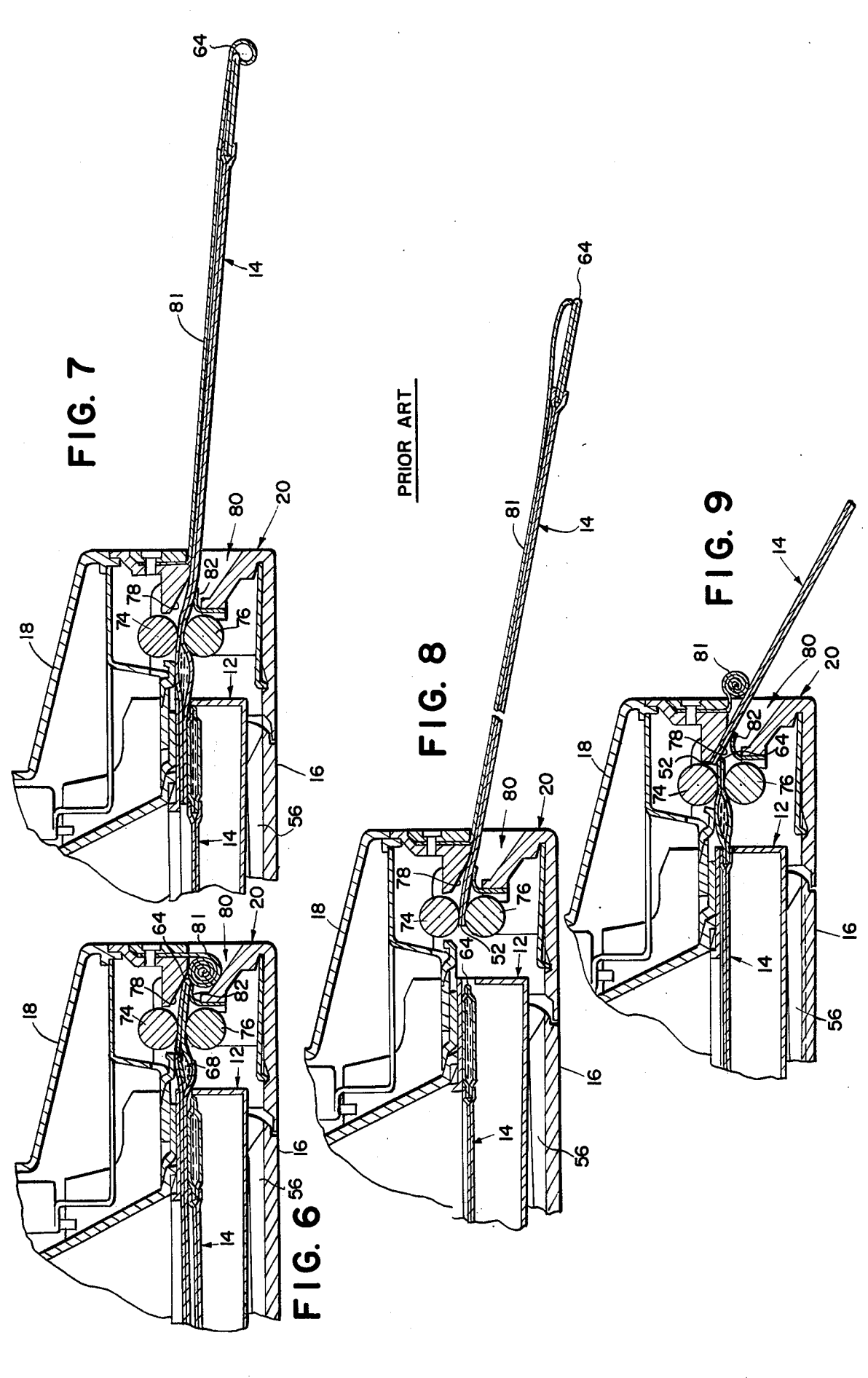

Because this piped light can produce unwanted fogging of the final image, the camera 10 has been provided with a light shade in the form of a resilient coil of opaque material 81 that initially covers the exit 80 and is in position to intercept the leading edge 64 of an advancing film unit to progressively cover it as it is advanced to the outside of the camera 10 (See FIG. 3). The function of the coil 81 is to provide additional protection, in the form of a light shade, for the film unit as it is advanced into the ambient light until all portions of its photoexposed area are covered with the processing fluid 68. The length of the coil 81 is chosen so that it disengages from the leading edge 64 only after all photoexposed portions of the film unit are covered with the processing fluid 68 at which time it automatically disengages from the leading edge 64 and returns to a position adjacent the exit 80 and overlying the film unit. After the trailing edge 52 of the film unit 14 leaves the roller gap, the film unit is gripped by a pair of resilient members, 83 and 84, which force it against the surface 78 and releasably hold it in position to be manually removed by the user. This sequence of events is illustrated in FIGS. 6 through 9. The problem with this arrangement comes about if the user does not remove a processed film unit. This is illustrated in FIG. 9. You will recall that the camera 10 is capable of consecutively processing one film unit after another. What is illustrated in FIG. 9 is the relationship between a next advancing film unit and a prior advanced one held by the gripping arrangement. It can be seen that the trailing edge 52 of the first advanced film unit has flipped out of the normal path of travel of the leading edge 64 of the subsequently advancing film unit. The result of this is apparent; the second advanced film unit travels underneath the prior advanced one and completely misses the coil 81 thereby subjecting it to possible fogging.

Figure 12:
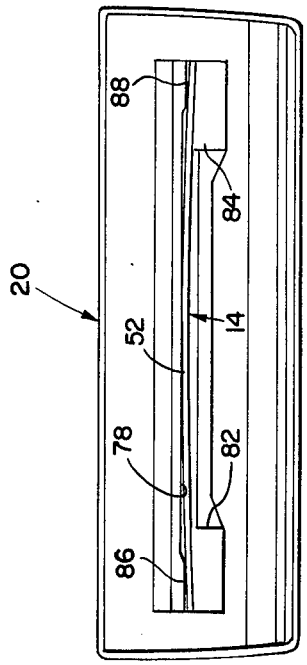
FIG. 12 is a diagrammatic rear elevational view illustrating the trailing edge of a film unit disposed within the exit slot contained in the housing employing the present invention.
Figure 13:
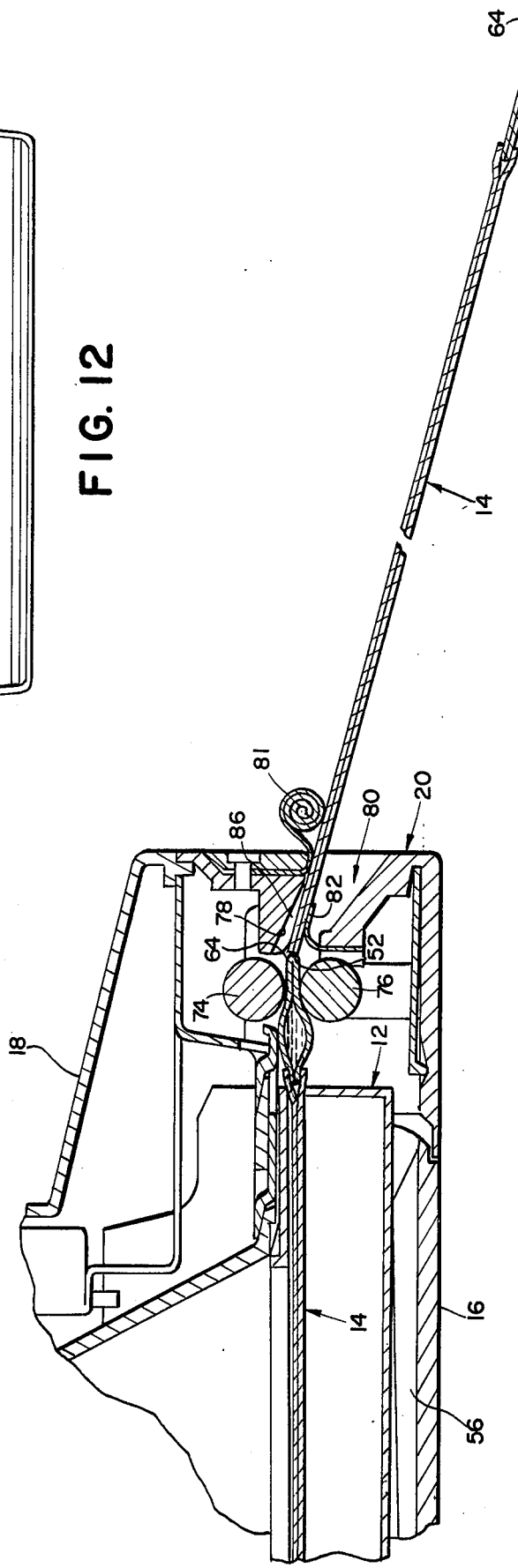
FIG. 13 is a view similar to FIG. 10 illustrating how the present invention aligns the trailing edge of the previously processed film unit in the path of travel of the leading edge of a film unit next advancing from the apparatus.
Figure 14:
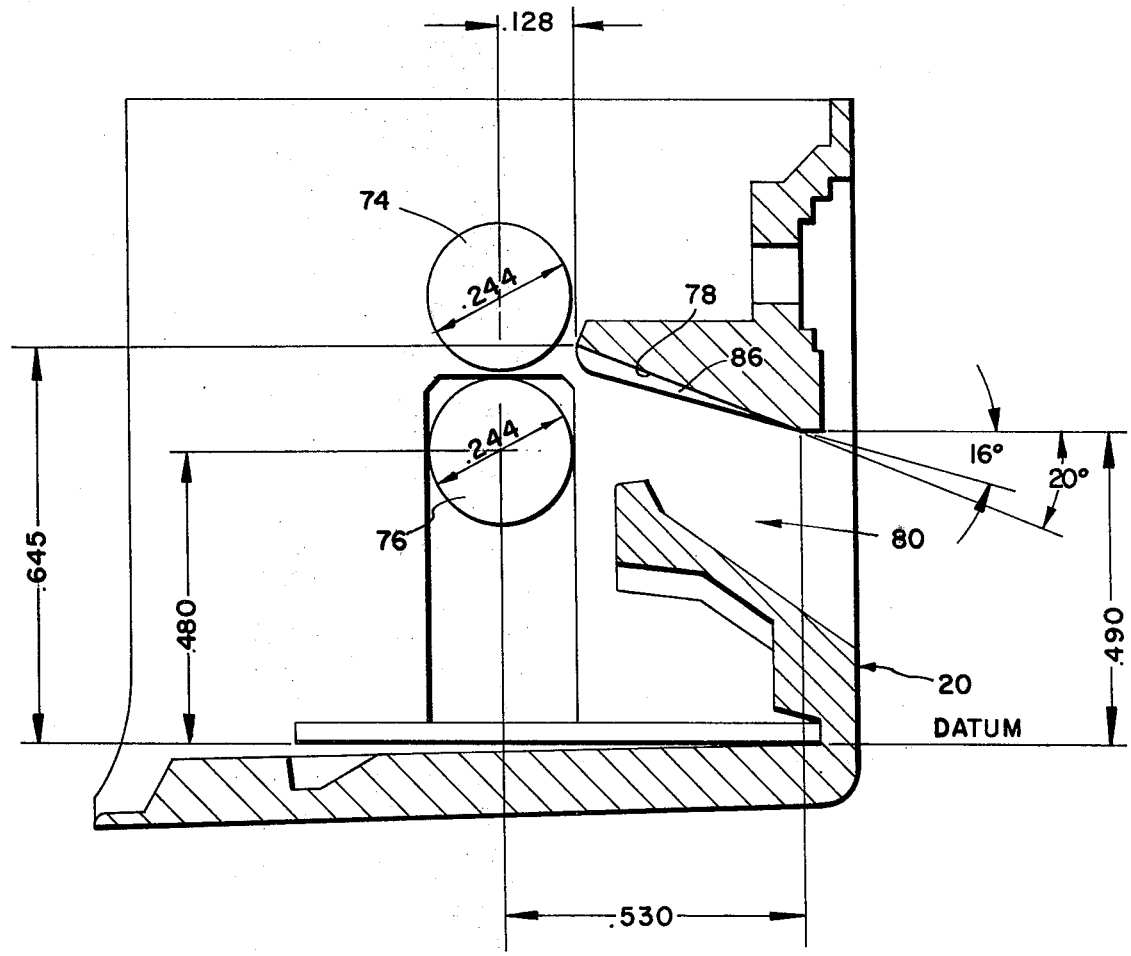
FIG. 14 is a side elevational view illustrating certain dimensions of the preferred embodiment.

The present invention prevents this from occurring. As seen in FIGS. 10 through 13, a pair of spaced apart ramps, 86 and 88, are provided on the cam surface 78 for the purpose of preventing the trailing edge 52 of the film unit 14 from flipping out of the normal path of travel of the leading edge 64 of a next advancing film unit. The effect of the ramps, 86 and 88, is to substantially align the edges of the film units so that one can push the other out of the camera. FIG. 13 illustrates this. It can also be seen in FIG. 13, that the gripping force holding the first advanced film unit will terminate in sufficient time to allow the first film unit to clear the camera 10 thereby allowing the coil 81 to retract to its position covering the exit 80 before the leading edge 64 of the next advancing film unit reaches it. Also note that the ramps, 86 and 88, taper from the exit 80 so that their high points are substantially in alignment with the normal path of travel of the leading edge 64 of a film unit as it emerges from the roller gap. Again in FIG. 11 notice that the pair of resilient members, 82 and 84, are wider than the width of the ramps and overlay them touching the cam surface 78. This overlapping creates end moments on the longitudinal edges of the film unit adjacent its trailing edge only when the film unit is being gripped after it leaves the rollers. The end moments, in turn, induce a transverse bow in the trailing edge of the film unit so that it presents a larger target for the leading edge of a subsequently advancing film unit thereby making it easier for one film unit to push the other out of the way. This is illustrated in FIG. 12. Also note that the ramps, 86 and 88, do not influence the bend in the film unit as it is being processed, i.e., its fluid is being spread across its photoexposed area 72. (See FIG. 10) This is so because of the geometry involved, the length of the container 66, and the time when the fluid reaches the photoexposed portions of the film unit with reference to the time that the bend in the film unit is established to influence the fluid thickness across this area. Because the container 66 is longer than the distance, D, shown in FIG. 10 and because of the other geometry shown in more detail in FIG. 14, the bend in the film unit is created before the fluid is spread across the photoexposed area 72, and the film unit curvature as illustrated in FIG. 10 is such that it is spaced away from the ramps 86 while the fluid is being spread across the photoexposed area 72. This is an important aspect of the invention; the ramps only perform their function after the fluid 68 has been spread across the photoexposed area of the film unit and thus do not in any way influence fluid spreading over this area.

FIG. 11 illustrates the ramps 86, 88, as an integrally molded part of the housing member 20 which can be fabricated using plastic injection molding techniques. Also the rollers, 74 and 76, are shown mounted in a U-shaped support bracket 90. The upper roller, 74, has attached to it a drive gear 92 which may be brought into engagement with a suitable drive mechanism (patent previously referenced) to effect its rotation. The bracket 90 can be mounted to the housing section 20 in any conventional manner to complete the film advance and fluid processing subsystem to be used with the camera 10. Certain dimensions have been indicated in FIG. 14 in order to impart a full understanding of the present invention and the advantages attendant therewith. However, it is to be expressly understood that these dimensions are exemplary only and are not to be interpreted as restricting the scope of the present invention in any manner.

Since certain changes may be made in the structure disclosed above without departing from the scope of the invention, it is intended that all matter contained in the above description or shown in the accompanying drawings shall be interpreted as illustrative and not in a limiting sense.

What is claimed is:

1. Photographic apparatus comprising:

means for receiving and locating a stacked array of resiliently flexible, substantially flat, rectangular self-processable film units with a foremost one in position for exposure, each of the film units having a leading edge and a trailing edge spaced from its leading edge and including a container of processing fluid mounted adjacent its leading edge, each of the film units thus arranged to have its fluid spread across preselected portions thereof as a pressure is progressively applied to it from its leading to its trailing edge;

a pair of juxtaposed fluid spreading rollers that form an elongated pressure generating gap between them that is positioned to receive the leading edge of a foremost film unit after its exposure to progressively apply a pressure to the film unit as it advances therethrough;

means for defining an elongated film exit and for releasably gripping the film unit when a portion thereof is disposed in said exit, said exit being offset with respect to the path of travel that the leading edge of the film unit would normally follow as it emerges from said gap, said exit further being positioned so that a major portion of the film unit extends therethrough and outside of said apparatus when the trailing edge of the film unit leaves said gap;

actuable means for advancing the foremost film unit from said exposure position and introducing its leading edge into said gap;

actuable means for driving at least one of said rollers to advance the foremost film unit through said gap; and means for engaging the leading edge of the foremost film unit and directing it toward said exit as the foremost film unit is being advanced through said gap and for preventing the trailing edge of the foremost film unit, when it leaves said gap, from flipping out of said normal path of travel under the influence of its resiliently flexible characteristic so that the leading edge of the next film unit advancing through said gap will engage the trailing edge of the prior advanced film unit to push it entirely outside of said apparatus.

2. The photographic apparatus of claim 1 wherein said last stated means is structured to impart a transversely extending bow to the trailing edge of the foremost film unit when it leaves said gap to facilitate its engagement by the leading edge of the next film unit advancing through said gap.

3. The apparatus of claim 1 wherein said last stated means consists of a unitary member presenting a contoured film unit engaging surface extending intermediate said gap and said exit.

4. The apparatus of claim 2 wherein said directing and preventing means comprises a surface extending a given distance intermediate said gap and said exit and having a pair of raised ramps, each of given width, respectively disposed adjacent its transverse ends, said ramps being spaced apart a predetermined distance so as to engage peripheral longitudinal edge portions of a film unit as its trailing edge emerges from said gap.

5. The apparatus of claim 1 wherein said exit defining and film unit gripping means exerts a gripping force, inwardly of said apparatus from said exit, on a film unit advancing through said exit and additionally including a resiliently flexible strip of opaque material, said strip of material having one end attached to said apparatus, a section extending over said exit and its other end formed as a coil seated against said apparatus such that the leading edge of a film unit advancing through said exit engages said strip of material causing it to progressively uncoil to cover and light shade one side of the film unit emerging from said exit, said strip of material being dimensioned to automatically effect the release of its said other end from the leading edge of the film unit extending through said exit when a predetermined portion of the film unit has been advanced through said exit at which time the resilient characteristic of said strip of material causes said strip of material to recoil in the direction of said apparatus and exert a force on the film unit ejecting the film unit from the apparatus when its trailing edge is free of said gripping force, said strip of material then being able to return to its initial position extending across said exit to be subsequently engageable by the leading edge of the next film unit advancing through said exit before the leading edge of the next film unit is able to block the return movement of said strip of material across said exit.

6. Photographic apparatus comprising:

means for receiving and locating a stacked array of resiliently flexible, substantially flat, rectangular self-processable film units with a foremost one in position for exposure, each of the film units having a leading edge and a trailing edge spaced from its leading edge and including a container of processing fluid mounted adjacent its leading edge, each of the film units thus arranged to have its fluid spread across preselected portions thereof as a pressure is progressively applied to it from its leading to its trailing edge;

a pair of juxtaposed fluid spreading rollers that form an elongated pressure generating gap between them that is positioned to receive the leading edge of a foremost film unit after its exposure to progressively apply a pressure to the film unit as it advances therethrough;

means for defining an elongated film exit and for releasably gripping the film unit when a portion thereof is disposed in said exit, said exit further being positioned so that a major portion of the film unit extends therethrough and outside of said apparatus when the trailing edge of the film unit leaves said gap, said exit defining and gripping means exerting a gripping force, inwardly of said apparatus from said exit, on a film unit advancing through said exit;

actuable means for advancing the foremost film unit from said exposure position and introducing its leading edge into said gap;

actuable means for driving at least one of said rollers to advance the foremost film unit through said gap;

means for engaging the leading edge of the foremost film unit and directing it toward said exit as the foremost film unit is being advanced through said gap and for preventing the trailing edge of the foremost film unit, when it leaves said gap, from flipping out of said normal path of travel under the influence of its resiliently flexible characteristic so that the leading edge of the next film unit advancing through said gap will engage the trailing edge of the prior advanced film unit to push it entirely outside of said apparatus; and a resiliently flexible strip of opaque material, said strip of material having one end attached to said apparatus, a section entending over said exit and its other end formed as a coil seated against said apparatus such that the leading edge of a film unit advancing through said exit engages said strip of material causing it to progressively uncoil to cover and light shade one side of the film unit emerging from said exit, said strip of material being dimensioned to automatically effect the release of its said other end from the leading edge of the film unit extending through said exit when a predetermined portion of the film unit has been advanced through said exit at which time the resilient characteristic of said strip of material causes said strip of material to recoil in the direction of said apparatus and exert a force on the film unit ejecting the film unit from the apparatus when its trailing edge is free of said gripping force, said strip of material then being able to return to its initial position extending across said exit to be subsequently engageable by the leading edge of the next film unit advancing through said exit before the leading edge of the next film unit is able to block the return movement of said strip of material across said exit.

7. The photographic apparatus of claim 6 wherein said directing and preventing means is structured to impart a transversely extending bow to the trailing edge of the foremost film unit when it leaves said gap to facilitate its engagement by the leading edge of the next film unit advancing through said gap.

8. Photographic apparatus comprising;

means for receiving and locating a stacked array of resiliently flexible, substantially flat, rectangular self-processable film units with a foremost one in position for exposure, each of the film units having a leading edge and a trailing edge spaced from its leading edge and including a container of processing fluid mounted adjacent its leading edge, each of the film units thus arranged to have its fluid spread across preselected portions thereof as a pressure is progressively applied to it from its leading to its trailing edge;

a pair of juxtaposed fluid spreading rollers that form an elongated pressure generating gap between them that is positioned to receive the leading edge of a foremost film unit after its exposure to progressively apply a pressure to the film unit as it advances therethrough;

means for defining an elongated film exit and for releasably gripping the film unit when a portion thereof is disposed in said exit, said exit being further positioned so that a major portion of the film unit extends therethrough and outside of said apparatus when the trailing edge of the film unit leaves said gap;

actuable means for advancing the foremost film unit from said exposure position and introducing its leading edge into said gap;

actuable means for driving at least one of said rollers to advance the foremost film unit through said gap; and means for guiding the leading edge of the foremost film unit through said exit as the foremost film unit is being advanced through said gap and for preventing the trailing edge of the foremost film unit, when it leaves said gap, from flipping out of said normal path of travel under the influence of its resiliently flexible characteristic so that the leading edge of the next film unit advancing through said gap will engage the trailing edge of the prior advanced film unit to push it entirely outside of said apparatus, said last stated means being further structured to impart a transversely extending bow to the trailing edge of the foremost film unit when it leaves said gap to facilitate its engagement by the leading edge of the next film unit advancing through said gap.

9. Photographic apparatus comprising:

means for receiving and locating a stacked array of resiliently flexible, substantially flat, rectangular self-processable film units with a foremost one in position for exposure, each film unit having a leading edge and trailing edge spaced from the leading edge, and including a container of processing fluid mounted adjacent its leading edge, each film unit thus arranged to have its fluid spread across preselected portions thereof as a pressure is progressively applied to it from its leading to its trailing edge;

a pair of rotatably mounted juxtaposed fluid spreading rollers that form an elongated pressure generating gap between them that is positioned to receive the leading edge of a foremost film unit after its exposure to progressively apply a pressure to the film unit as it advances therethrough;

actuable means for advancing the foremost film unit from said exposure position and introducing its leading edge into said gap;

actuable means for driving at least one of said rollers to advance the foremost film unit through said gap;

an elongated film exit spaced away from said gap in the direction of travel of the advancing film unit and offset with respect to the path of travel that the leading edge of the film unit would normally follow as it emerges from said gap, said exit further being positioned so that a major portion of the film unit extends therethrough and outside of said apparatus when the trailing edge of the film unit leaves said gap;

a transverse elongated surface, positioned in said normal path of travel of the leading edge of the film unit as it initially emerges from said gap, to intercept the leading edge to bend the film unit toward said exit, said bending surface having a portion thereof extending from said exit toward said gap at an acute angle with respect to said normal path of travel and further including a pair of spaced apart ramp portions located respectively adjacent its opposite transverse ends for preventing the trailing edge of the film unit, after it leaves said gap, from flipping out of said normal path of travel under the influence of its resiliently flexible characteristic, each of said ramps being of a given width and sloping away from said acute angle portion at a section thereof adjacent said exit so that the high points of said ramps are substantially in alignment with said normal path of travel;

a pair of spaced apart resilient members each of greater width than said given width of said ramps and respectively disposed in initial contact with said ramps in a region adjacent said exit and overlapping said ramps to have a portion of each said resilient member seated against said acute angle portion of said elongated surface transversely inwardly of said ramps such that said resilient members engage selected portions of the film unit as the film unit is advancing through said exit to exert a gripping force on it forward of said exit to hold the film unit against said ramps, said resilient members thus serving to releasably hold a portion of the film unit in said apparatus when the film unit's trailing edge clears said gap and to impart a transversely extending bow to the film unit's trailing edge at such time to facilitate its engagement by the leading edge of the film unit next advanced through said gap; and a resiliently flexible strip of opaque material, said strip of material having one end attached to said apparatus, a section extending over said exit and its other end formed as a coil seated against said apparatus such that the leading edge of a film unit advancing through said exit engages said strip of material causing it to progressively uncoil to cover and light shade one side of the film unit emerging from said exit, said strip of material being dimensioned to automatically effect the release of its said other end from the leading edge of the film unit extending through said exit when a predetermined portion of the film unit has been advanced through said exit at which time the resilient characteristic of said strip of material causes said strip of material to recoil in the direction of said apparatus and exert a force on the film unit ejecting the film unit from the apparatus when its trailing edge is free of said gripping force, said strip of material then being able to return to its initial position extending across said exit to be subsequently engageable by the leading edge of the next film unit advancing through said exit before the leading edge of the next film unit is able to block the return movement of said strip of material across said exit.

10. Photographic apparatus comprising:

means for receiving and locating a stacked array of resiliently flexible, substantially flat, rectangular self-processable film units with a foremost one in position for exposure, each film unit having a leading edge and trailing edge spaced from the leading edge, and including a container of processing fluid mounted adjacent its leading edge, each film unit thus arranged to have its fluid spread across preselected portions thereof as a pressure is progressively applied to it from its leading to its trailing edge;

a pair of rotatably mounted juxtaposed fluid spreading rollers that form an elongated pressure generating gap between them that is positioned to receive the leading edge of a foremost film unit after its exposure to progressively apply a pressure to the film unit as it advanced therethrough;

actuable means for advancing the foremost film unit from said exposure position and introducing its leading edge into said gap;

actuable means for driving at least one of said rollers to advance the foremost film unit through said gap;

an elongated film exit spaced away from said gap in the direction of travel of the advancing film unit and offset with respect to the path of travel that the leading edge of the film unit would normally follow as it emerges from said gap, said exit further being positioned so that a major portion of the film unit extends therethrough and outside of said apparatus when the trailing edge of the film unit leaves said gap;

a transverse elongated surface of given length positioned in said normal path of travel to intercept the leading edge of the foremost film unit to bend the film unit toward said exit so that when a portion of the film unit is disposed in said exit, the remaining portions of the film unit located intermediate said exit and said gap are spaced away from and out of contact with said surface until such time as the film unit's trailing edge clears said gap, said length of said surface extending from said exit toward said gap, said surface further including a pair of spaced apart ramp portions of given width protruding therefrom and located adjacent its opposite transverse ends, said ramps being of substantially the same length as said given length of said surface and tapered to have their thinnest edge terminate substantially adjacent said exit and their thickest portions substantially in alignment with said normal path of travel, said ramps being thus structured to prevent the trailing edge of the film unit, after it leaves said gap, from flipping out of said normal path of travel under the influence of its resiliently flexible characteristic;

a pair of spaced apart resilient members each of greater width than said given width of said ramps and respectively disposed in initial contact with said ramps in a region adjacent said exit and overlapping said ramps to have a portion of each resilient member seated against said elongated surface transversely inwardly of said ramps such that said resilient members engage selected portions of the film unit as the film unit is advancing through said exit to exert a gripping force on it forward of said exit to hold the film unit against portions of said ramps and said surface, said resilient members thus serving to releasably hold a portion of the film unit in said apparatus when the film unit's trailing edge clears said gap and to impart a transversely extending bow to the film unit's trailing edge at such time to facilitate its engagement by the leading edge of the film unit next advanced through said gap.

11. Photographic apparatus comprising:

means for receiving and locating a stacked array of resiliently flexible, substantially flat, rectangular self-processable film units with a foremost one in position for exposure, each film unit having a leading edge and trailing edge spaced from the leading edge, and including a container of processing fluid mounted adjacent its leading edge, each film unit thus arranged to have its fluid spread across preselected portions thereof as a pressure is progressively applied to it from its leading to its trailing edge;

a pair of rotatably mounted juxtaposed fluid spreading rollers that form an elongated pressure generating gap between them that is positioned to receive the leading edge of a foremost film unit after its exposure to progressively apply a pressure to the film unit as it is advanced therethrough;

actuable means for advancing the foremost film unit from said exposure position and introducing its leading edge into said gap;

actuable means for driving at least one of said rollers to advance the foremost film unit through said gap;

an elongated film exit spaced away from said gap in the direction of travel of the advancing film unit and positioned so that a major portion of the film unit extends therethrough and outside of said apparatus when the trailing edge of the film unit leaves said gap;

a transverse elongated surface of given length for guiding the film unit toward said exit so that when a portion of the film unit is disposed in said exit, the remaining portions of the film unit located intermediate said exit and said gap are spaced away from and out of contact with said surface until such time as the film unit's trailing edge clears said gap, said length of said surface extending from said exit toward said gap, said surface further including a pair of spaced apart ramp portions of given width protruding therefrom and located adjacent its opposite transverse ends, said ramps being of substantially the same length as said given length of said surface and tapered to have their thinnest edge terminate substantially adjacent said exit and their thickest portions substantially in alignment with said normal path of travel, said ramps being thus structured to prevent the trailing edge of the film unit, after it leaves said gap, from flipping out of said normal path of travel under the influence of its resiliently flexible characteristic;

a pair of spaced apart resilient members each of greater width than said given width of said ramps and respectively disposed in initial contact with said ramps in a region adjacent said exit and overlapping said ramps to have a portion of each said resilient member seated against said elongated surface transversely inwardly of said ramps such that said resilient members engage selected portions of the film unit as the film unit is advancing through said exit to exert a gripping force on it forward of said exit to hold the film unit against portions of said ramps and said surface, said resilient members thus serving to releasably hold a portion of the film unit in said apparatus when the film unit's trailing edge clears said gap and to impart a transversely extending bow to the film unit's trailing edge at such time to facilitate its engagement by the leading edge of the film unit next advanced through said gap.

* * * * *